United States Patent
Nair

(10) Patent No.: US 7,816,833 B2
(45) Date of Patent: Oct. 19, 2010

(54) METHOD AND DEVICE FOR ENERGY GENERATION

(75) Inventor: Balakrishnan Nair, Sandy, UT (US)

(73) Assignee: Oscilla Power Inc., Salt Lake City, UT (US)

( * ) Notice: Subject to any disclaimer, the term of this patent is extended or adjusted under 35 U.S.C. 154(b) by 0 days.

(21) Appl. No.: 12/622,637

(22) Filed: Nov. 20, 2009

(65) Prior Publication Data

US 2010/0133937 A1   Jun. 3, 2010

(51) Int. Cl.
*H02K 3/00* (2006.01)
*F03D 9/00* (2006.01)

(52) U.S. Cl. .................. 310/191; 310/103; 290/44; 290/54

(58) Field of Classification Search .............. 310/13, 310/15, 27, 36, 103, 105, 191, 209; 290/43, 290/44, 54, 55; 415/4.2–4.5; 416/9, 93 R, 416/179

See application file for complete search history.

(56) References Cited

U.S. PATENT DOCUMENTS

| 1,352,960 | A  | * | 9/1920  | Heyroth .................... 290/44 |
| 4,720,640 | A  | * | 1/1988  | Anderson et al. ............ 290/43 |
| 5,631,507 | A  | * | 5/1997  | Bajric et al. ............. 310/67 A |
| 6,375,424 | B1 | * | 4/2002  | Scarpa ........................ 416/4 |
| 6,455,975 | B1 | * | 9/2002  | Raad et al. ................ 310/209 |
| 6,911,741 | B2 | * | 6/2005  | Pettersen et al. ............ 290/44 |
| 7,116,006 | B2 | * | 10/2006 | McCoin ...................... 290/54 |

* cited by examiner

*Primary Examiner*—Tran N Nguyen
(74) *Attorney, Agent, or Firm*—Jeffrey T. Holman

(57) ABSTRACT

A method and device for using radial relative displacement between a magnet and coil to generate electricity from fluid motion. The device includes a support structural component, a movable magnetic structure, a rotating structural component, and bearings. The movable magnetic structure is coupled to the support structural component. The rotating structural component rotates relative to the support structural component. The bearings are coupled to or disposed with the rotating structural component. The rotation of the rotating structural component results in forces applied by the bearings on the movable magnetic structure and movement of the movable magnetic structure.

34 Claims, 5 Drawing Sheets

METHOD AND DEVICE FOR ENERGY GENERATION

BACKGROUND

Embodiments of the invention described herein relate to a method and device for producing electricity by conversion of the mechanical energy of wind or other moving fluids.

Wind power, one of the most promising sources of renewable energy, is starting to be adopted more and more globally. Conventional wind power is based on wind turbines. Conventional wind turbines are rotating machines that convert the kinetic energy in wind into mechanical energy. Wind turbines can be separated into two types based by the axis around which the turbine rotates. Most turbines rotate around a horizontal axis, but some designs have been proposed where the turbine rotates around a vertical axis. Globally, the installed wind capacity was in excess of 120 GW by the end of 2008.

Horizontal axis wind turbines used in commercial wind farms are usually of a three-bladed design. Computer controlled motors orient the blades to face the wind direction. A gear box is commonly used to step up the speed of the generator, although designs may also use a direct drive of an annular generator. Some models operate at constant speed, but more energy can be collected by variable-speed turbines which use a solid-state power converter to interface to the transmission system. Most turbines are equipped with shutdown features to avoid damage at high wind speeds.

While wind power adoption has been increasing, there are still issues to be overcome before wind power generation can be cost competitive with conventional power generation on its own merit, without government subsidies or tax credits. One of the issues is the high cost associated with tower height. Due to the inability to harvest sufficient energy at low wind-speeds (i.e., low heights) using conventional designs, the towers need to be very tall as wind speeds are greater at higher altitude. Unfortunately, this requirement can increase the cost of a wind turbine substantially. Transportation of the tall towers and blades can account for up to 20% of the total installed cost of a wind farm. Massive tower construction is required to support the heavy blades, gearbox, and generator. Furthermore, these tall turbines require expensive cranes and skilled operators. Increased tower height also increases maintenance costs as cyclic stress, fatigue, and vibration tend to cause failure more frequently in taller turbines. Tower height can even increase public relations costs as taller turbines are likely to increase complaints from residents about damage to their landscape views. Generator designs that allow for a greater conversion efficiency allowing for a similar power rating to be achieved at a smaller tower height/wind speed, therefore, have a commercial advantage.

Another problem with conventional wind-turbines is the technology's low capacity factor. Capacity factor is the ratio of the actual amount of power produced by the wind turbine over time relative to the power that would have been produced if the wind turbine operated at maximum output 100% of the time. The typical capacity factor of a conventional wind turbine is 25-40% as the wind turbine is designed to work only between specific wind-speeds. At low wind-speeds, below the "cut in" speed, the turbine blades do not rotate. At very high wind-speeds they are designed to stop operating for safety reasons. The idle time results in an effectively high cost of energy, and a resulting problem with these types of turbines is that they are typically not used as primary power sources due to the unreliability of the power output. Wind turbine designs that allow for operation across a wider range of wind speeds, which will increase the capacity factor, are therefore beneficial.

One feature of conventional generators that results in a relatively high cut-in speed requirement before significant power is generated by the turbine is the fact that these turbines need a gearbox to convert the low revolutions per minute (typically 0-60 RPM) rotations of the rotor to high RPM rotations of a generator shaft (typically over 1000 RPM). The gearbox results in mechanical energy loss, unacceptable component failure rates, and a relatively high cut-in speed requirement.

Finally, smaller generator designs that have smaller size and weight relative to conventional wind turbines are advantageous because they have lower capital, transportation, installation, and maintenance costs than heavier/bigger generators.

SUMMARY

Embodiments described herein include a method and device for converting the kinetic energy of wind into magnetic and/or electrical energy using novel designs that utilize permanent magnets. The embodiments combine proven concepts from existing technologies such as the basic design of wind-turbines with a new novel design using radial displacement of permanent magnets relative to electrical conductors to create a new method and device for generating electrical energy from wind. Embodiments of the design are expected to have relatively low capital costs and very good survivability. The device may be modular and scalable and capable of delivering up to and over 5 MW of power in a single unit, and over 1 GW of power in a wind farm that has many turbines with such devices installed. Some embodiments may include power management strategies to manage or optimize the delivered power from a suite of these devices.

In a specific embodiment, the device includes a rotating component that rotates around an axis, at least one magnetic component and at least one electrical conductor or electrically conductive coil, and a design and/or mechanism that allows for periodic relative displacement between the magnetic component and the coil in a radial direction relative to the axis of rotation. The coil is oriented such that the relative displacement between the magnetic component and the coil results in a change in magnetic field experienced by the coil, and this change in magnetic field results in an induced current/voltage in the coil. The device may be incorporated in a wind turbine with a central shaft and a plurality of blades, wherein wind flow over the plurality of blades causes rotation of the rotating component.

It should be noted that the relative displacement in the radial direction between the permanent magnet and the coil results in the power generation. Either the magnetic component or the coil may be attached to or mechanically coupled with the rotating component.

The magnetic component may be a permanent magnet or an electromagnet, and the specific references to a permanent magnet and/or an electromagnet in this description in no way limits the scope of this invention.

In a specific embodiment, the device includes a rotating structural component that rotates around an axis, at least one loading component (e.g., a bearing) that revolves or orbits around the axis synchronously with the rotating component, and at least one movable magnetic structure that experiences a change in spatial location in response to the periodic contact motion, forces applied by or impact of one or more loading components. In one embodiment, the loading components contact a spring mechanism as the loading components revolve or orbit around the axis with the rotating structural component. The moving magnetic structure includes at least one component that contains one or more magnets which experiences a change in spatial location thereby generating a pulsating or oscillating magnetic field. The change in magnetic field can be used to induce a current/voltage in an electrical conductor, or electrically conductive coil, that is in the vicinity of the magnet.

Embodiments of the device may be incorporated in a wind turbine with a central shaft and a plurality of blades, wherein wind flow over the plurality of blades causes rotation of the central shaft to produce the relative movement between the loading component and the spring mechanism component that is coupled to the magnet structure.

In some embodiments, the loading component is a bearing or an equivalent structure that is coupled to or an integral part of the rotating component, either attached to it or otherwise mechanically coupled to it. The use of the word bearing to describe the embodiments herein in no way limits the scope of this invention. Furthermore, it should be understood that the loads on a spring mechanism causing an oscillating motion of the magnets can be created through a variety of designs.

In a specific embodiment a group of permanent magnets are attached to or connected in some manner to a structural plate that is connected to a spring mechanism. The magnets are spaced and oriented in such a way as to increase or maximize the strength of the magnetic field in the space or plane above the magnets. Additionally, the permanent magnets are spaced and oriented so that the change in magnetic field strength in the vicinity of the magnets obtains a range of maximum strength to zero in a relatively short distance or the shortest distance possible. In this way, a maximum or relatively large variation in magnetic field strength can be obtained with the smallest or a relatively small amount of spatial movement. In some embodiments, the movement of the magnets in the vicinity of the coils results in the maximum variation of magnetic field strength in the smallest distance when the design is optimized.

In a specific embodiment, the device includes a first structural component containing a spring mechanism, a permanent magnet structure, and an outer rotating structural component. The outer rotating structural component substantially circumscribes the first structural component and at least partially defines an annular space between the first structural component and the outer rotating structural component. The permanent magnet structure is coupled within the annular space between the first structural component and the rotating structural component. The permanent magnet structure includes one or more permanent magnets connected to a support plate that is held in a fixed position relative to the rotating structural component by a support structure and is mechanically coupled to the rotating motion of the blades of a wind turbine through one or more bearings. As the blades rotate, the bearings periodically make contact with one or more support plates and cause a movement of the support plates and permanent magnets relative to a copper wire coil. The periodic motion of the permanent magnets relative to the copper coil results in an oscillating magnetic field which in turn induces a voltage and current in the copper coil.

In some embodiments, it is desirable to incorporate a permanent magnet structure that is designed such that the magnetic field intensity in the vicinity of the permanent magnet structure in at least one direction changes significantly with distance from the permanent magnet structure. In some embodiments, the magnetic field strength may change by at least over 0.05 Tesla in at least one direction at locations in the vicinity of that permanent magnet structure that are at most at a distance of 1 cm from each other along that particular direction. In one embodiment, the magnetic field strength may change by over 0.1 Tesla in at least one direction at locations in the vicinity of that permanent magnet structure that are at most at a distance of 1 cm from each other along that particular direction. Such a magnetic field may be created by arranging or shaping permanent magnets in a suitable fashion. One configuration to create such a magnetic field is by using an array of permanent magnets with their north and south poles alternated on adjacent movable magnetic structures.

Some embodiments described herein implement a generator design that does not need a gear box, can work efficiently at lower wind-speeds and smaller tower heights than conventional wind turbines, and can function across a wider range of wind-speeds or function at higher energy conversion efficiency. Other embodiments of the device for energy conversion are also described.

Embodiments for a method of energy conversion are also described. In one embodiment, the method includes producing an orbital movement of a bearing from a directional flow of fluid. The method also includes generating motion of one or more permanent magnets in response to the orbital movement of the bearing. Each permanent magnet structure includes one or more permanent magnets oriented in a substantially radial arrangement relative to an orbital path of the bearing. At least a portion of each permanent magnet structure is located within the orbital path of the bearing. The method also includes generating a changing magnetic field in response to the oscillating motion of the permanent magnets within the permanent magnet structure. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
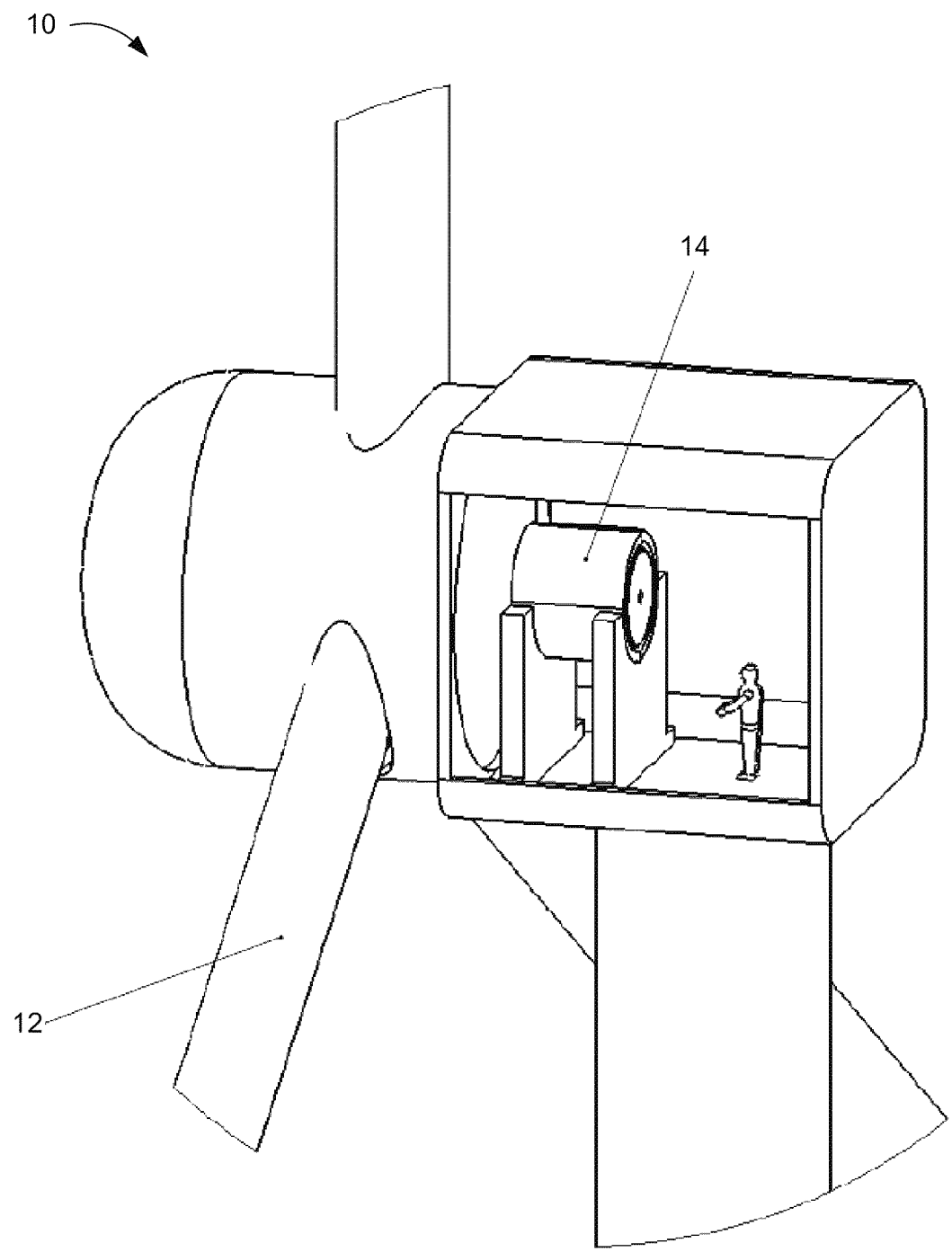
FIG. 1 shows a schematic diagram of one embodiment of a wind turbine system for generating energy using oscillating permanent magnets.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some embodiments include a method and device to capture the kinetic energy of wind and convert this energy into electrical energy. In this description, references to "wind" refer to any moving gas, and the use of the word "wind" in no way limits the scope or applicability of the invention to the ambient environment or naturally occurring wind alone. For example, it may refer to exhaust gases from vehicles or engines.

In one embodiment, the method includes utilizing the wind, or another moving fluid, to cause oscillating motion of one or more permanent magnets. The method also includes using a corresponding change in magnetic field from the oscillating magnets to generate an electric voltage and/or electric current in one or more electrically conductive coils or circuits that are in the vicinity of the permanent magnets.

In another embodiment, the device includes a mechanism whereby one or more magnets undergoes a change in spatial location in a radial direction relative to the rotating structural component. There are many methods by which one or more magnets can be moved in a radial direction as a result of the motion from a rotating structural component. One example is using bearings attached in some manner to the rotating structural component that apply a force load to a spring mechanism as the structural component rotates. The bearings are located on or integrated with the structural component so that in one instance the bearing applies the force to the spring mechanism and then as the structural component rotates the bearing breaks contact with the spring mechanism so that no force is applied to the spring mechanism and the spring returns the permanent magnet back to its original spatial location. By applying and releasing the force to the spring, an oscillating motion is generated in one or more magnets. Electrical coils located in the vicinity of the oscillating magnets in turn generate a current and voltage due to the pulsating magnetic field caused by the oscillating magnets. In light of the description herein, it can be easily appreciated by one skilled in the art that other embodiments of the device can be configured to have the coil move radially, while the magnet is fixed.

In some embodiments, the device for energy conversion includes a support structural component, at least one magnetic structure, at least one coil, a rotating structural component to rotate relative to the support structural component, and loading features coupled to the rotating structural component. Rotation of the rotating structural component around its axis of rotation results in forces applied by the loading features on the magnetic structure or coil so as to result in relative displacement between the magnetic structure and the coil in a radial direction relative to the axis of rotation of the rotating structure.

In another embodiment, the method includes utilizing wind, or another moving fluid, to cause motion of one or more rotating components, which in turn result in an oscillating motion of one or more permanent magnets to which one or more of the rotating components may be coupled mechanically. The method also includes using a corresponding change in magnetic field resulting from the oscillating permanent magnet to generate an electric voltage and/or electric current in one or more electrically conductive coils or circuits that are in the vicinity of the permanent magnets. Thus, as the wind blows, the periodic motion of the permanent magnets follows an oscillation or pulse, resulting in a rapidly changing magnetic field. This changing magnetic field may be used to generate an induced voltage in a coil located in the vicinity of the permanent magnet (refer to the details in FIGS. 3 and 4) by Faraday's law of induction, which is represented by the following equation:

$$\epsilon = -n(d\phi/dt),$$

where n is the number of turns of the coil, and the term $(d\phi/dt)$ is the time derivative of the magnetic flux, $\phi$. Other embodiments of methods for generating electricity are also described.

In one embodiment, the device includes at least one component that is made of, is attached to, or contains one or more permanent magnets which, is exposed to wind or another moving fluid. The device is designed such that the motion of the wind directly causes oscillating motion in one or more permanent magnets. The device may also include one or more electrically conductive coils or circuits within the vicinity of one or more of the magnets, wherein a corresponding change in magnetic field resulting from the oscillating motion of the permanent magnet generates an electric voltage and/or electric current in one or more electrically conductive coils or circuits.

In another embodiment, the device includes a rotating structural component with blades attached to it. The device is deployed in wind or in another moving gas, and designed such that the blades move and rotate the rotating structural component when the wind blows. The device also includes one or more permanent magnets mechanically coupled to or adjacent to the rotating structural component, such that the rotation of the rotating structural component causes a pulsating or oscillating motion in one or more permanent magnets. The oscillating motion may be caused, for example, by bearings which are connected to the rotating structural component that press against and release one or more springs that are connected to the permanent magnet structure. The device may also include electrically conductive coils or circuits within the vicinity of one or more of the permanent magnets. A corresponding change in magnetic field resulting from the oscillating motion of the permanent magnet generates an electric voltage and/or electric current in the electrically conductive coil or circuit. Other embodiments of devices for generating electricity are also described.

Embodiments of the device include one or more of the following components:

1. A rotating support structure that is coupled with blades that when exposed to wind or moving fluid will rotate due to forces applied to the blades by the wind or moving fluid or otherwise caused by the wind or moving fluid.
2. Bearings, rods, or other similar components mechanically coupled to the rotating support structure.
3. A movable magnet structure that contains at least one, and possibly many, permanent magnets of such geometry and arranged in such a fashion so that at least one cross-section of the core has a circular, or approximately circular, geometry.
4. Electrical coils around or in the vicinity of at least one of the permanent magnets.

The support structure is mounted on the core such that the bearings/rods or other components can roll on the surface of the core that has the circular cross-section. The structure is designed such that when the wind blows (or fluid moves) around the blades, the blades cause the shaft to rotate, and the bearings roll on the core that has the permanent magnets such that each bearing/rod applies a force on the spring mechanism that results in a pulsating or oscillating motion of the permanent magnets when they are in contact and the load relaxes as the bearing/rod rolls off. In one example, if there are p bearings and the wind forces the shaft to rotate at a rate of f rotations per second, then each division of permanent magnets in this design will undergo spatial displacement at a frequency of pf (p multiplied by f) times per second. In one embodiment, the structure is designed such that the load experienced as each bearing passes over results in a motion of the support plate that causes the permanent magnets to move relative to the coil in the vicinity such that the magnetic field strength oscillates from maximum strength to zero or near zero magnetic field strength. The amount of spatial displacement of the permanent magnets can be varied by using bearings/rods of varying diameters that will apply a different force to the spring mechanism. Additionally, the spring constant of the spring can be varied to change the amount and rate of spatial displacement of the permanent magnets. Alternatively, the design can include mechanical stops that may limit the motion of the permanent magnet such that it may come very close to, but not touch, the coil. In one embodiment, the design may include mechanical stops that will allow the permanent magnet or magnets to come within a few thousandths of an inch of the coil without making physical contact. This would allow the coil to experience a very high magnetic field when the magnet or magnets is so close to the coil, and a significant change in magnetic field as the magnet moves away.

Some embodiments described herein do not require a shaft/axle that supports the electrical generator. The reduced load carried by the rotating structural component will allow it to turn at lower wind speeds than conventional horizontal axis wind turbines with similar blade geometries at similar wind speeds, thereby increasing the capacity factor significantly.

Examples of engineering improvements that may be achieved by the kind of turbines described herein include, but are not limited to, electronic or mechanical servo-actuated load control between the bearings, designs and materials for the various components that will enhance component life, designs for the core that will improved or maximize the power output, etc. Other embodiments may exhibit additional improvements and/or increased performance.

The permanent magnet structure may contain one or more coils in the vicinity of the permanent magnets with polymer (e.g., Teflon, PTFE) coated copper wire to the desired number of turns. The selection of the polymer is not critical, except that the polymer should be rated to provide electrical insulation for the highest rated voltage expected in the coil. The wire diameter may be optimized for the intended application, as there is a trade-off between 1) using an increased wire diameter to lower electrical resistance of the coil that allows the delivery or a greater voltage and higher power (lower IR losses) and 2) using a decreased wire diameter to lower the cost and weight of the coil itself.

Referring again to the construction of the permanent magnets, other embodiments may use other materials including Alnico alloys composed of Aluminum, Nickel, Cobalt, Copper, Iron and Titanium. Other materials may include ceramic magnets (ferrites) which are composed of Barium, and/or Strontium Iron oxides. Other materials may include rare earth permanent magnets which are composed of Iron alloys containing rare earth and transition metals such as Terbium, Dysprosium, Erbium, Cobalt, etc. Other materials may include permanent magnets of the group consisting primarily of Iron, Chromium and Cobalt with trace components of vanadium, silicon, titanium, zirconium, manganese, molybdenum or aluminum. Additionally, for some designs the use of electromagnets may be beneficial. The type of permanent magnet chosen for any particular application is determined by the cost versus the strength of the magnetic field.

Embodiments described herein are suitable for use with various specific orientations of the turbine (i.e., horizontal axis or vertical axis), as well as specific designs of blades or other associated components.

The specific types and configurations of the permanent magnets and coil in no way limit the type, orientation, structure, or composition of either the permanent magnets or the coil. The term permanent magnet generally refers to a component or structure, at least a portion of which is constructed of materials possessing magnetic properties. The coil may, without limitation, be wound, suspended, printed, or otherwise constructed or located in the vicinity of the permanent magnet. For reference, the "vicinity" of the permanent magnet refers to any location adjacent to or within the proximity of the permanent magnet which allows the coil to sufficiently experience the changing magnetic flux density of the permanent magnet so as to result in a measurable voltage or current, for example, greater than about 0.01 mV or about 0.01 μA, respectively. More specifically, the vicinity may be limited to distances at which the coil experiences a measurable change in the magnetic field strength of the permanent magnet. Since the strength and profile of the changing magnetic field may depend on the configuration of the permanent magnet, and the sensitivity of the coil may depend on the construction and placement of the coil, the "vicinity" of the permanent magnet may vary from one embodiment to another.

The specific configurations of the permanent magnets and coils along with supporting structures, shown and described herein, provide a few examples of ways in which oscillating permanent magnets can be utilized as energy generating devices. These examples illustrate that permanent magnets that are caused to oscillate by coupling a force load from a rotating shaft with bearings and a spring mechanism can be used as energy generating devices by applying and releasing a force load to a spring mechanism using rotating bearings that alternatively apply and release a force load to a spring mechanism.

For reference, the combination of the permanent magnets, a spring mechanism and the support plate may be referred to as a permanent magnet structure. In some embodiments, the accompanying coils or electrical circuits are also considered part of the permanent magnet structures.

Thus, the permanent magnet structure has several "divisions," each of which includes one or more permanent magnets, one or more spring mechanisms and a corresponding support plate component. In one embodiment, the outer load-bearing components, when assembled with all the other similar components, form a cylindrical/conical or approximately cylindrical/conical outer surface for the inner core. The components of each division may be machined in the shape of rectangles or any other shape or may themselves be structures composed of several individual permanent magnets and other mechanical fixtures. These divisions may have a mechanism either internally or externally that may be used cause relative motion of the permanent magnets with respect to the coils in the vicinity. Each permanent magnet component or group of permanent magnet components has electrical conductors or electrically conductive coils in their vicinity.

Each bearing is specifically designed to produce an oscillating motion of one or more permanent magnets when the bearing is aligned with the corresponding support plate and spring mechanism component. In some embodiments, the contact surface of each support plate component is substantially accurate. When there is no movement between the outer shaft and the inner core, the bearings are in contact with the afore-mentioned cylindrical/conical or approximately cylindrical/conical outer surface of the core. The bearings may be mounted in grooves or receptacles and are located so that the bearings provide a force load to the support plate of the structural support framework that holds the permanent magnet structure. The number of bearings may be equal to or less than the number of divisions, or support plate components. In one embodiment, the number or bearings may be a simple fraction of the number of divisions (e.g., one-half, one-third, two-third, one-fourth, etc). For example, if the number of bearings is half the number of divisions, the bearings will contact the outer surface of every other support plate component at a particular time.

In some embodiments, it may be desirable to reduce the torque required to rotate the rotating structural component at a particular rpm. This may be accomplished by designing the support plates in a jagged fashion so that as the bearing rolls over from a first support plate to a second support plate, the first point that the bearing makes contact on the second support plate is at a location that is lower (i.e., closer to the axis of rotation) than the last point that the bearing makes contact with on the first support plate as it leaves the first support plate. This geometry of the contact surface may be referred to as an inclined loading surface.

Figure 5:
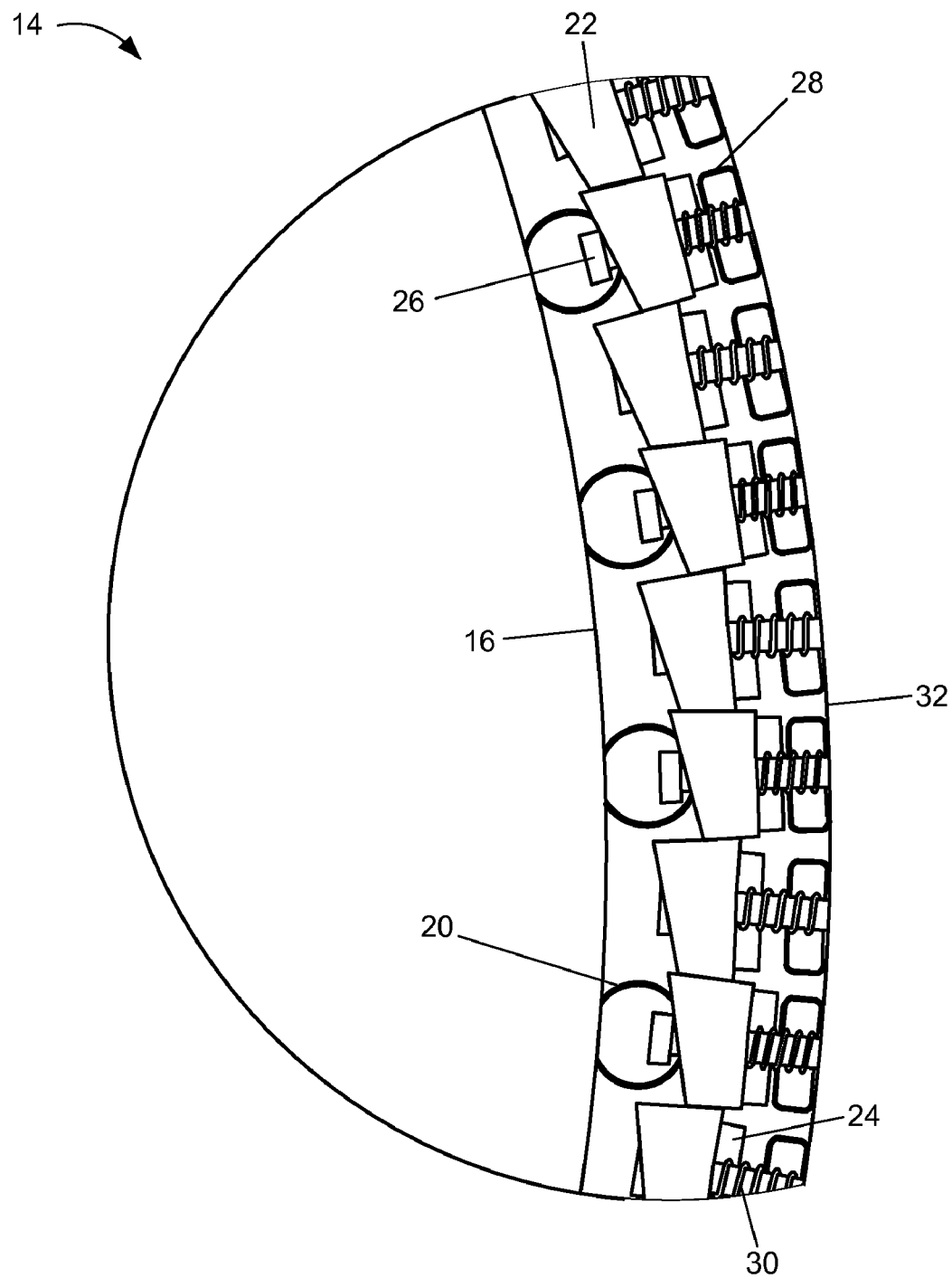
FIG. 5 shows another detailed illustration of another embodiment of the energy generating device of FIG. 2.

The blades of the co-axial energy generator are coupled, for example, to the outer structural component to convert available energy from various sources (wind, flowing air or gas, steam, water or other fluid, mechanical rotary motion) to a torque that causes relative rotational motion between the outer structural component and the inner core support structure. In this way, the bearings roll around the above-defined outer surface of the inner core. Alternatively, the inner core may be configured to rotate in response to the fluid movement, while the outer structural component maintains a relatively fixed location (refer to FIG. 5). In either case, in some embodiments the rotating structural component may have an additional support member in order to provide adequate support to the rotating structural component such that an even and uniform load is applied to the spring mechanism component. In some embodiments, this extra support member may contain a rigid support structure along with multiple bearings to enable the smooth rotation of the rotating structural component. In some embodiments, the additional structural member is located on the opposite end than the wind blades are located.

In some embodiments, it may be desirable to incorporate a permanent magnet structure that is designed such that the magnetic field intensity in the vicinity of the permanent magnet structure in at least one direction changes significantly with distance from the permanent magnet structure. In some embodiments, the magnetic field strength may change by at least over 0.05 Tesla in at least one direction at locations in the vicinity of that permanent magnet structure that are at most at a distance of 1 cm from each other along that particular direction. In a preferred embodiment, the magnetic field strength may change by over 0.1 Tesla in at least one direction at locations in the vicinity of that permanent magnet structure that are at most at a distance of 1 cm from each other along that particular direction. Such a magnetic field may be created by arranging or shaping permanent magnets in a suitable fashion. One configuration to create such a magnetic field is by using an array or permanent magnets with their north and south poles alternated. For example, some embodiments may include an array or magnets with rectangular cross-section oriented such that two of their long faces are oriented to be the north and south poles, and spaced apart by a pre-determined spacing. In some embodiments, the magnets are spaced in an alternating fashion so that one magnet has the north pole facing the coil and the next magnet has the south pole facing the coil. This pattern may be repeated for the entire array of magnets. In some embodiments, the spacing between the magnets may be as small as 1 cm. In some embodiments, the spacing between the magnets may be smaller than 5 mm.

In the specific example of a wind turbine, the outer shaft may be mechanically coupled to the blades. In this embodiment, the blades used may be conventional blades used in the wind-turbine industry, and the specific type of blades used in no way limits the scope of this embodiment. As the wind blows, the blades will experience lift forces that translate to a torque on the rotating structural component. This will cause the rotating structural component to rotate relative to the inner core. As the rotating structural component completes each revolution relative to the inner core, each of the bearings will roll over each support plate component of the inner core. When a bearing is in contact with any particular support plate component, the corresponding permanent magnet component in the division undergoes a spatial displacement relative to its zero position, which can be defined as the location of the permanent magnet when no force load is applied by the bearings to the support plate and spring mechanism. For example, if the permanent magnets are in a position where the magnetic field strength affecting the coil in the vicinity is at or near zero when there is no force load applied to the spring mechanism, then this condition is defined as the baseline or zero condition location. Conversely, when the force load from the bearing is applied to the support plate and spring mechanism this results in a spatial displacement of the permanent magnet causing it to move closer to the coil in the vicinity whereby the magnetic field strength affecting the coil reaches a maximum. This change in magnetic field results in an induction current/voltage in a conductive coil or circuit in the vicinity of the permanent magnet component. The magnetic field generated by each of the permanent magnet components changes at a frequency in Hz equal to (Nb)*(r/60), where Nb is the number of bearings and r is the revolutions per minute (rpm).

The specific configuration of the bearings and the shape of the rotating structural component do not limit the scope of this embodiment. For example, instead of a single cylindrical roller bearing, in one embodiment, a number of smaller cylindrical or spherical bearings may be in contact with each load-bearing support plate component. In one embodiment, the bearings are disposed along the circumference of the rotating structural component or along a direction such that the axis of the orbital path of the bearings is parallel to the rotational axis of the rotating structural component.

Other embodiments may be implemented in which the various components between the rotating structural component and the inner core are rearranged. For example, the bearings may be attached to, in contact with, or adjacent to an inner shaft, and the permanent magnet components may be attached to, in contact with, or adjacent to an outer support plate and support structure. Other embodiments may include different shapes and/or configurations of components. For example, the contact surfaces of the support plate components, wherein the bearings contact the support plate components during rotational movement, may have different symmetrical or asymmetrical shapes relative to the direction of travel of the bearings relative to the support plate components.

The embodiments described herein are illustrated in more detail by way of example in FIGS. 1-4. FIG. 1 shows a schematic diagram of one embodiment of a wind turbine system 10 a wind turbine system for generating energy using a permanent magnet energy generator. The illustrated energy generation system 10 includes a wind turbine 12 and a permanent magnet energy generator 14. More specifically, FIG. 1 illustrates the relationship between the wind turbine 12 and the energy generating device 14, which includes permanent magnets, a spring mechanism, coils, and supporting structures, which are described in more detail below with reference to the specific embodiments shown in FIGS. 2-4. It should also be noted that, although the example embodiment shown and described herein includes certain structural components and corresponding functionality, other embodiments may be implemented using fewer or more components to achieve less or more functionality.

Figure 2:
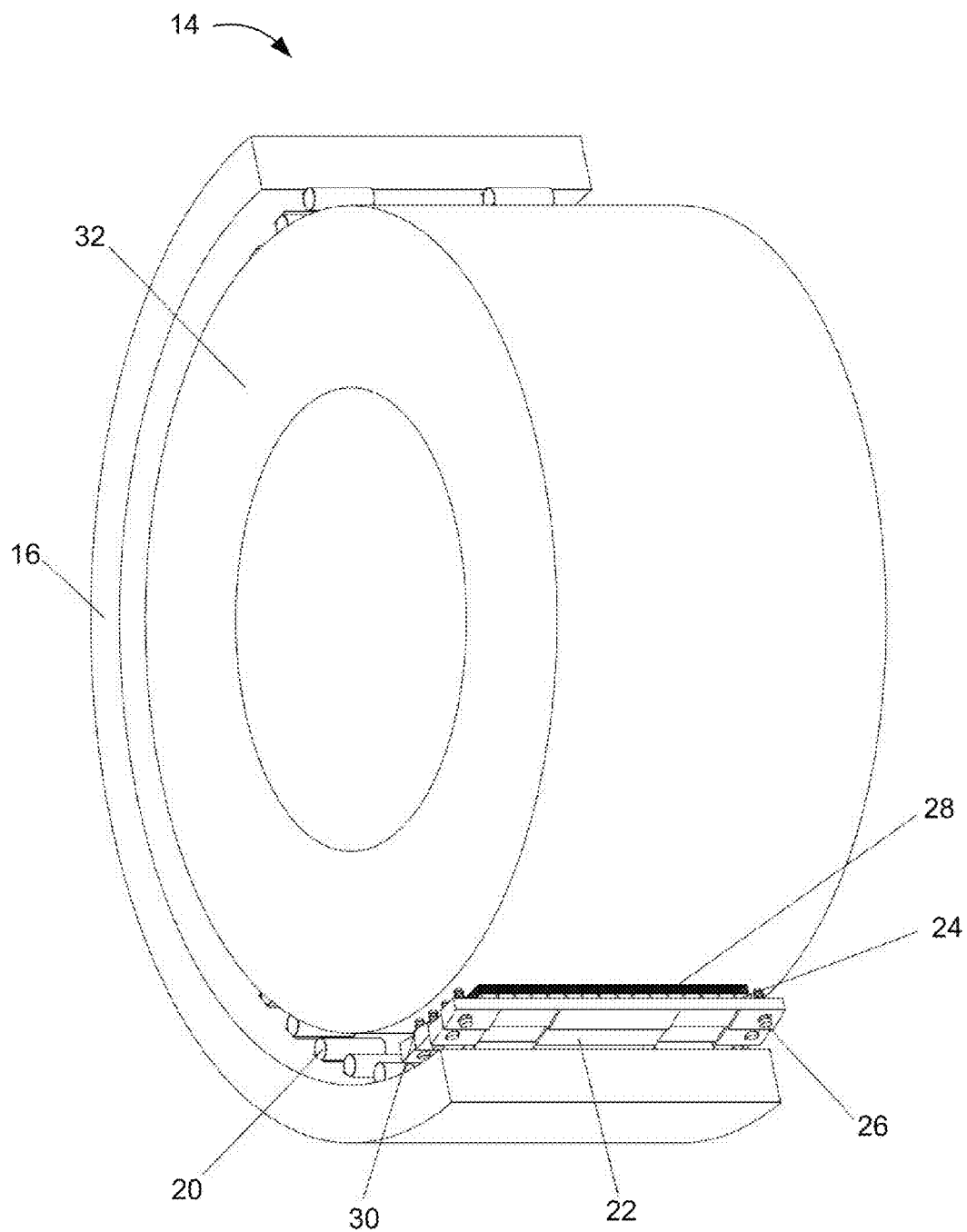
FIG. 2 shows a schematic diagram of one embodiment of the energy generating device of FIG. 1.
Figure 3:
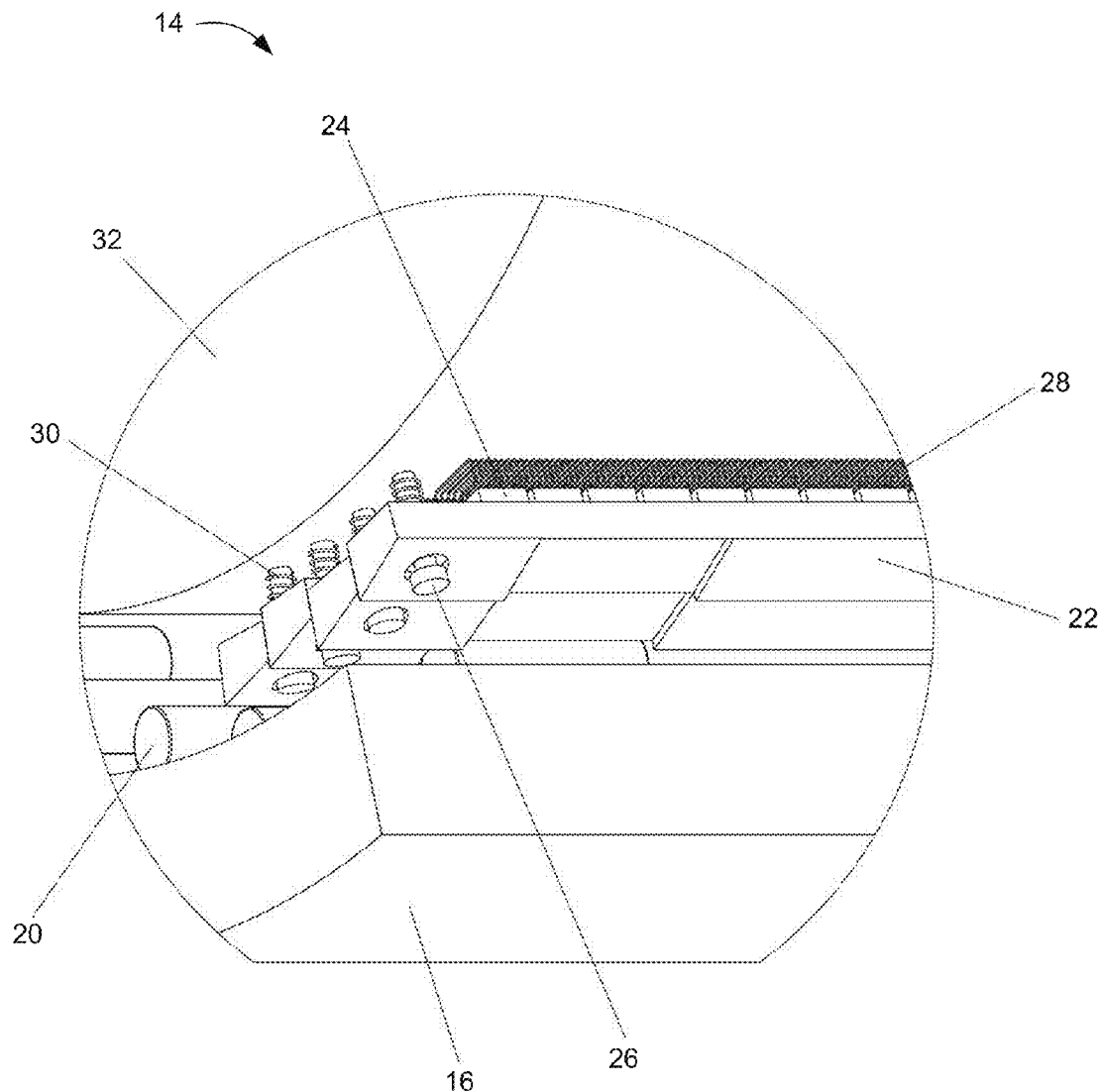
FIG. 3 shows a more detailed illustration of the energy generating device of FIG. 2.
Figure 4:
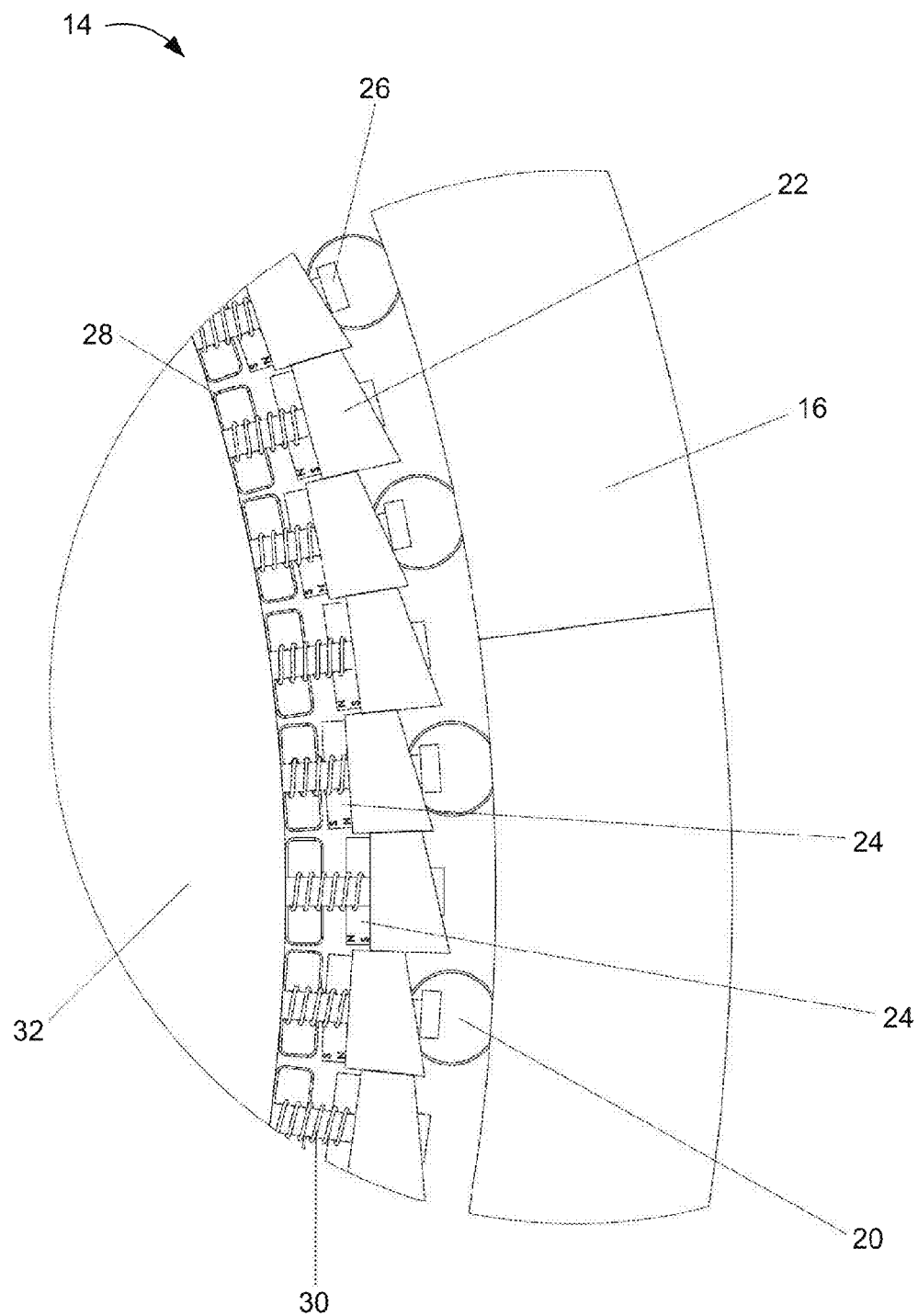
FIG. 4 shows another detailed illustration of the energy generating device of FIG. 2.

FIG. 2 shows a schematic diagram of one embodiment of the energy generating device 14 of FIG. 1. FIGS. 3 and 4 show a more detailed illustration of the energy generating device 14 of FIG. 2. More specifically, these figures show views of one arrangement of the various components of the energy generating device 14 of the wind turbine system 10. The illustrated energy generating device 14 includes a rotating structural component 16 and a plurality of bearings 20 coupled to an inner surface of the rotating structural component 16. The illustrated energy generating device 14 also includes a plurality of support plates 22 coupled to corresponding groups of energy generating elements 24. The energy generating elements 24 are also referred to as movable magnetic components. In one embodiment, the energy generating elements 24 include permanent magnets, although other embodiments may use other geometric forms of permanent magnets or electromagnets. The illustrated energy generating device 14 also includes structural bolts 26 which connect to the inner support structure 32 and are surrounded by compression springs 30. Electrical circuits or coils 28 are attached to an inner support structure 32.

In this example, the rotating structural component 16 is connected to the wind blades of the wind turbine 12 which are driven by the wind causing the rotating structural component 16 to rotate. The rotating structural component 16 and the bearings 20 located on the inner surface of rotating structural component 16 rotate relative to the inner support structure 32 which is fixed and stationary. As the rotating structural component 16 rotates, the bearings 20 move along an orbital path relative to the rotational axis of the rotating structural component 16. Additionally, the bearings 20 come in contact with a portion of the support plates 22. In this embodiment, the support plates 22 also may be referred to as compression plates, because the force of the bearings 20 on the support plates 22 causes a compressive load to be applied to support plates 22 and compression springs 30. Upon further rotation, the bearings 20 roll or otherwise move off of the individual support plates 22, thus releasing the compressive load and allowing the compression springs 30 to return the corresponding support plate 22 and permanent magnets 24 to the zero or resting point.

This action of applying and releasing a compressive load to the support plates 22 results in an oscillating motion of the support plates where the compressive force causes the support plates 22 and therefore permanent magnets 24 to move closer to the coils 28 as the compression springs 30 are compressed. As the bearing 20 rolls off an individual support plate 22 the compression spring 30 pushes the support plate 22 back to its zero or resting position causing the support plate 22 and permanent magnets 24 to move away from the coils 28. This oscillating movement of the support plate 22 and the corresponding magnets 24 as the bearings 20 move over the support plate 22 results in a pulsating magnetic field (alternately increasing and decreasing in strength) at the coils 28. The pulsating magnetic field caused by the oscillating motion of permanent magnets 24 is used to induce a voltage in the nearby coils 28. The permanent magnets 24 are firmly connected to support plate 22 so that any motion imparted to the support plates 22 by the action of the bearings 20 and compression springs 30 causes a similar motion of the permanent magnets 24. Hence, as the shaft 16 and bearings 20 rotate, the support plates 22 and connected permanent magnets 24 undergo an oscillating motion as the bearing 20 alternately contact and then release contact from the support plate 22. As the bearing contact is released, the compression spring 30 pushes the support plate 22 back to its original spatial location before the bearing 20 caused the support plate 22 to move. This oscillating motion of support plate 22 and permanent magnets 24 results in a pulsating magnetic field as the permanent magnets 24 first move towards coils 28 as the bearings 20 contact support plate 22 and then the permanent magnets 24 move away from coils 28 as the bearing 20 releases the compressive force and the compression spring 30 pushes the support plate 22 away from the coils 28. This oscillating motion creates a change in magnetic field, which results in a current/voltage in the corresponding coils 28.

FIGS. 3 and 4 show enlarged detail views to more clearly illustrate the relationship between the bearings 20 contacting the support plates 22 resulting in movement of support plate 22 towards coils 28 while compressing the spring 30. Then, once the load of the bearing 20 is removed, the compression spring 30 pushes the support plate 22 away from the coils 28 resulting in an oscillating motion of support plate 22 and connected permanent magnets 24.

In light of the description herein, it is clearly understood by anyone skilled in the art that the description of the embodiment above can easily be inverted whereby the rotating structural component is located on the inside and the fixed supporting structure is located outside and surrounding the rotating structural component.

Various types of lubricant may be used with the bearings to lower the cut-in speed, to reduce the torque needed to achieve a certain rpm, and/or to increase the usable life of the bearings. The use of or type of lubricants in no way limits the scope of this embodiment.

Various types of cooling systems may be used to prevent over heating of the induction coils including air and water cooling. The use of or type of cooling systems in no way limits the scope of this embodiment.

The outputs from the various permanent magnet elements may be electrically or electronically coupled in various forms to generate a desirable output voltage/current characteristic. For example, the outputs from all the elements that are in contact with bearings at a particular time can be coupled in electrical series to generate a high-voltage A/C output. The use of electrical connections or power electronics to process the electrical output in a desired fashion in no way limits the scope of this embodiment.

It is anticipated that several of the embodiments described herein are capable of providing outputs as may be desirable to specific utilities or consumers such as different frequencies, output voltages, AC/DC current characteristics, etc. by either changing the number, type and/or configuration of permanent magnet elements or through electrical design modifications. For example, outputs from individual permanent magnet elements may be changed by changing the number of coils. Frequencies may be changed by changing the number of permanent magnet elements, and the "phase" may be changed by changing the pitch or spacing (linear or angular) of the permanent magnet elements.

It should be noted that the technology described herein is clean and creates electricity from wind without consuming any carbonaceous fuels or generating any harmful pollutants. The substitution of the energy generated by embodiments described herein may reduce green house gases and pollutants, compared with fossil fuels, without undesirable side-effects or compromises.

At least some of the embodiments described herein result in higher energy conversion efficiency and/or delivered power at lower wind-speeds than conventional wind turbines. Also, coupling or combining portions of one or more of the embodiments described herein with conventional turbines can result in greater efficiency, greater delivered power, a wider operating window of wind speeds and/or a greater capacity factor than conventional wind turbines.

In some embodiments, power electronics are implemented to convert the electrical energy output from the embodiments described herein. The power electronics also may condition or modify the electrical energy and feed the conditioned power to a target energy consuming device/structure or electricity grid. The specific type or configuration of the power electronics in no way limits the scope of this invention. The energy consuming device may be a machine, building, vehicle, etc. The specific energy consuming device/structure or the specific nature of the electricity grid that the power is fed to does not in any way limit the scope of this invention.

Additionally, some of the embodiments described herein may be applicable to generating energy from other moving fluids.

In the above description, specific details of various embodiments are provided. However, some embodiments may be practiced with less than all of these specific details. Although the operations of the method(s) herein are shown and/or described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device for energy conversion, the device comprising:
   a support structural component;
   a moveable magnetic structure coupled to the support structural component;
   a rotating structural component to rotate relative to the support structural component; and
   bearings mounted on a surface of the rotating structural component, wherein the surface of the rotating structural component is facing a surface of the support structural component, wherein rotation of the rotating structural component results in forces applied by the bearings on the moveable magnetic structure and movement of the moveable magnetic structure.

2. The device of claim 1, further comprising an electrical circuit mounted to the support structural component, wherein the movement of the moveable magnetic structure induces an electrical current in the electrical circuit.

3. The device of claim 2, wherein the electrical circuit comprises a coil of electrically conductive material located within a vicinity of the moveable magnetic structure.

4. The device of claim 2, wherein the moveable magnetic structure comprises:
   a guide structure coupled to the support structural component;
   a support plate coupled mounted to the guide structure, wherein the guide structure guides the support plate in substantially radial movement relative to a rotational axis of the rotating structural component, wherein the support plate comprises a loading surface to make contact with and be loaded by the bearings upon rotation of the rotating structural component;
   a compression device interposed between the support plate and the support structural member, the compression device to compress upon movement of the support plate toward the support structural component; and
   a magnet coupled to the support plate, wherein movement of the support plate and the magnet induces the electrical current in the electrical circuit.

5. The device of claim 4, wherein the magnet comprises a permanent magnet.

6. The device of claim 4, wherein:
   the guide structure comprises a bolt; and
   the support plate comprises a hole through which the bolt passes, wherein the support plate slides along a length of the bolt toward the support structural component in response to the forces applied by each bearing and away from the support structural component in response to an elastic force of the compression device upon removal of the forces applied by each bearing.

7. The device of claim 6, wherein the compression device comprises a spring mounted around the bolt.

8. The device of claim 6, wherein the loading surface of the support plate is at an inclined angle relative to an approximate direction of movement of the bearing past the support plate so that the magnet coupled to the support plate is progressively pushed closer to the electrical circuit as the bearing moves past the support plate.

9. The device of claim 8, wherein the loading surface of the support plate comprises a groove aligned with the bearing so that the bearing passes through the groove as the bearing applies a force on the loading surface of the support plate.

10. The device of claim 1, further comprising a plurality of moveable magnetic structures coaxially located around the support structural component, wherein each of the moveable magnetic structures comprises a permanent magnet, and the permanent magnets of adjacent moveable magnetic structures are oriented with the poles in opposite directions.

11. The device of claim 1, further comprising a wind turbine with a plurality of blades, wherein wind flow over the plurality of blades causes rotation of the rotating structural component.

12. A method for converting energy, the method comprising:
    producing an orbital movement of a bearing from a directional flow of fluid, wherein the bearing is mounted on a surface of a rotating structural component, wherein the surface of the rotating structural component faces a surface of a support structural component;
    moving, in response to the orbital movement of the bearing, a moveable magnetic structure in a radial direction relative to a rotational axis of the orbital movement of the bearing, wherein the moveable magnetic structure comprises a magnet; and
    inducing an electrical current in an electrical circuit located within a vicinity of the magnet in response to the movement of the moveable magnetic structure and the magnet.

13. The method of claim 12, further comprising the bearing applying a force on a support plate of the moveable magnetic structure, wherein the magnet is coupled to the support plate.

14. The method of claim 13, further comprising:
    compressing a compression device by a movement of the support plate in response to the force applied by the bearing on the support plate; and
    returning the support plate to a resting position by an elastic force of the compression device, after the bearing stops applying the force on the support plate.

15. The method of claim 12, wherein moving the moveable magnetic structure in response to the orbital movement of the bearing further comprises moving the magnet progressively closer to the electrical circuit as the bearing moves past the moveable magnetic structure.

16. The method of claim 12, wherein the magnet comprises a permanent magnet.

17. The method of claim 12, wherein producing the orbital movement of the bearing from the directional flow of fluid further comprises rotating a rotating structural component in response to wind flow over a plurality of blades of a wind turbine, wherein the bearing is coupled to the rotating structural component.

18. A device for energy conversion, the device comprising:
    a support structural component;
    at least one magnetic structure;
    at least one coil;
    a rotating structural component to rotate relative to the support structural component; and
    loading features mounted on a surface of the rotating structural component, wherein the surface of the rotating structural component is facing a surface of the support structural component, wherein rotation of the rotating structural component around its axis of rotation results in forces applied by the loading features on the magnetic structure or coil to produce relative displacement between the magnetic structure and the coil in a radial direction relative to the axis of rotation of the rotating structural component.

19. The device in claim 18, further comprising a turbine with a plurality of blades, wherein fluid flow over or around the plurality of blades causes the rotation of the rotating structural component.

20. The device in claim 18, wherein the magnetic structure comprises at least one permanent magnet.

21. The device of claim 1, wherein the surface of the rotating structural component is an outer surface of the rotating component, and the surface of the support structural element is an inner surface of the support structural element.

22. The device of claim 1, wherein the surface of the rotating structural component is an inner surface of the rotating component, and the surface of the support structural element is an outer surface of the support structural element.

23. A device for energy conversion, the device comprising:
    a support structural component;
    a moveable magnetic structure coupled to the support structural component, wherein the moveable magnetic structure comprises:
        a guide structure coupled to the support structural component;
        a support plate coupled mounted to the guide structure, wherein the guide structure guides the support plate in substantially radial movement relative to a rotational axis of the rotating structural component, wherein the support plate comprises a loading surface to make contact with and be loaded by the bearings upon rotation of the rotating structural component;
        a compression device interposed between the support plate and the support structural member, the compression device to compress upon movement of the support plate toward the support structural component; and
        a magnet coupled to the support plate, wherein movement of the support plate and the magnet induces the electrical current in the electrical circuit;
    a rotating structural component to rotate relative to the support structural component; and
    bearings coupled to the rotating structural component, wherein rotation of the rotating structural component results in forces applied by the bearings on the moveable magnetic structure and movement of the moveable magnetic structure.

24. The device of claim 23, further comprising an electrical circuit mounted to the support structural component, wherein the movement of the moveable magnetic structure induces an electrical current in the electrical circuit.

25. The device of claim 24, wherein the electrical circuit comprises a coil of electrically conductive material located within a vicinity of the moveable magnetic structure.

26. The device of claim 23, wherein the magnet comprises a permanent magnet.

27. The device of claim 23, wherein:
    the guide structure comprises a bolt; and
    the support plate comprises a hole through which the bolt passes, wherein the support plate slides along a length of the bolt toward the support structural component in response to the forces applied by each bearing and away from the support structural component in response to an elastic force of the compression device upon removal of the forces applied by each bearing.

28. The device of claim 27, wherein the compression device comprises a spring mounted around the bolt.

29. The device of claim 27, wherein the loading surface of the support plate is at an inclined angle relative to an approximate direction of movement of the bearing past the support plate so that the magnet coupled to the support plate is progressively pushed closer to the electrical circuit as the bearing moves past the support plate.

30. The device of claim 29, wherein the loading surface of the support plate comprises a groove aligned with the bearing so that the bearing passes through the groove as the bearing applies a force on the loading surface of the support plate.

31. The device of claim 23, further comprising a plurality of moveable magnetic structures coaxially located around the support structural component, wherein each of the moveable magnetic structures comprises a permanent magnet, and the permanent magnets of adjacent moveable magnetic structures are oriented with the poles in opposite directions.

32. The device of claim 23, further comprising a wind turbine with a plurality of blades, wherein wind flow over the plurality of blades causes rotation of the rotating structural component.

33. A method for converting energy, the method comprising:

producing an orbital movement of a bearing from a directional flow of fluid, wherein the bearing applies a force on a support plate of the moveable magnetic structure;

moving, in response to the orbital movement of the bearing, a moveable magnetic structure in a radial direction relative to a rotational axis of the orbital movement of the bearing, wherein the moveable magnetic structure comprises a magnet coupled to the support plate; and inducing an electrical current in an electrical circuit located within a vicinity of the magnet in response to the movement of the moveable magnetic structure and the magnet.

34. The method of claim 33, further comprising:

compressing a compression device by a movement of the support plate in response to the force applied by the bearing on the support plate; and returning the support plate to a resting position by an elastic force of the compression device, after the bearing stops applying the force on the support plate.

* * * * *